Sept. 11, 1962  W. A. MEISSNER ET AL  3,053,291

SPICE SAW

Filed Dec. 9, 1960

United States Patent Office 3,053,291
Patented Sept. 11, 1962

3,053,291
SPICE SAW
William A. Meissner, Easton, and Robert W. Novak, Bethlehem, Pa., assignors to The Glidden Company, Cleveland, Ohio, a corporation of Ohio
Filed Dec. 9, 1960, Ser. No. 74,974
1 Claim. (Cl. 143—49)

This invention relates to a machine for cutting long fibrous spice pieces such as cinnamon into predetermined lengths and is concerned especially with cutting such spice efficiently, accurately, and safely.

Uniformity of length is desired for packaging spice sticks conveniently in bottles or the like. Heretofore it has been the practice to cut, for example, cinnamon into desired lengths by use of a conventional band saw which involves much manual labor for and hazard to the operator. Our machine not only makes it possible to cut such spice more rapidly and effectively with safety to the operator, but also it simultaneously performs a classifying action for the effective recovery of the premium stick spice itself as well as shorts, tailings, fines, and imperfect pieces. These latter materials can be ground in conventional manner for use as powdered spice.

The spices especially suitable for subdivision in our machine are fragile and of inconsistent thickness or diameter by the piece. Accordingly, to be machine-transported into the cutting zone they must be gripped fairly delicately, yet positively, to produce the highest yield of uniform product. Cinnamon, for example, ordinarily is fed to the machine in slender rolls of the brittle, dry bark of the plant *Cinnamomum loureirii*. Alternatvely, strips or sheets of spices can be so fed for cutting into lengths or slitting into strips.

To provide the safe cutting of such spice according to the precepts of our invention it is essential to establish a deformable work transfer zone, the work being the spice pieces as fed to the machine, which accommodates and carries the work into subdivision and discharges it in finished cut pieces to a location for suitable classification and subsequent handling.

In a broad aspect of the invention our machine comprises at least one set of power-actuated belt means adapted for traveling in a circuit having a substantially planar portion, rigid or flexible support means opposite to at least a portion of said substantially planar portion of said belt means for forming a deformable work gripping and transfer zone therebetween, power-actuated gang cutting means having blade means subdividing said work transfer zone, the entrance of said work transfer zone being ahead of said blade means and the discharge of said work transfer zone being after said blade means. The work gripping and transfer zone is preferably, but not necessarily, substantially horizontal.

Figure 1:
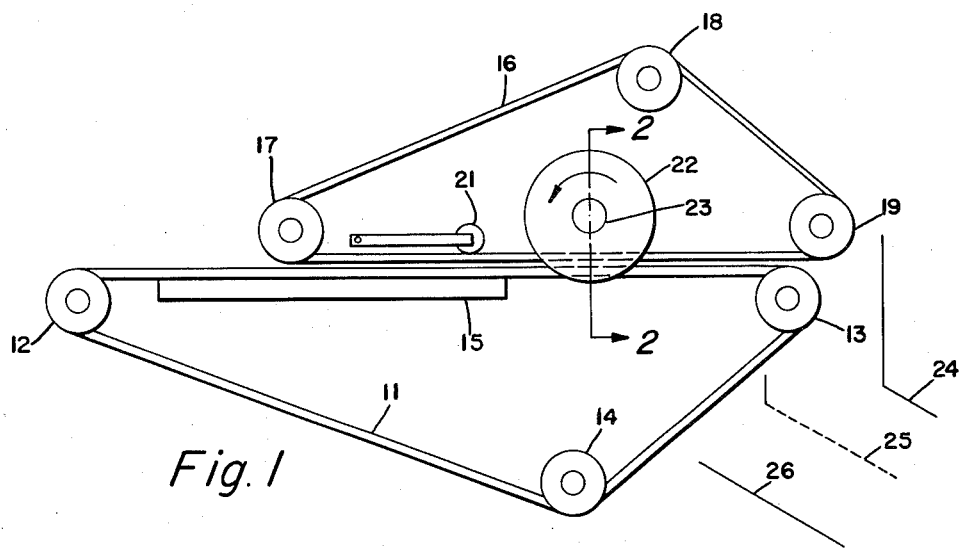

FIGURE 1 of the drawing shows in elevation a cross-section of our preferred machine. A lower set of six power-actuated, parallel, endless V-belts 11 travels clockwise in a circuit having apices provided by gangs of pulleys shown at 12, 13, and 14. This lower set of belts provides a substantially horizontal planar surface between pulleys 12 and 13 and travels over a wooden table 15. An upper set of six power-actuated, parallel, endless flat belts travels counterclockwise on a circuit formed by gangs of pulleys shown at 17, 19, and 18 and forms a substantially horizontal planar surface between pulleys 17 and 19. The rates of linear travel of the two sets of belts are, and that of each individual belt in a set is, substantially the same to minimize work breakage or motion other than uniformly toward the cutting zone.

The narrow space between the sets of belts 11 and 16 thus is a substantially horizontal, deformable, frictional work gripping and transfer zone adapted for receiving a feed of spice pieces starting below pulleys 17. The longitudinal axes of the feed pieces are positioned initially substantially transverse to the horizontal paths of belt travel above pulleys 12. Feed pieces are transported from left-to-right through a gang of circular saw blades 22, which are mounted on common axle 23, thence to ultimate discharge from the work gripping and transfer zone that terminates between pulleys 13 and 19.

Spring-loaded presser roll 21 presses gently downward on belt set 16, thereby assisting to make a convenient loose entry of work into the work gripping and transfer zone ahead of the gang saw, a more positive but gentle grip approaching and passing through the gang saw, and a gradual releasing of cut pieces for ultimate discharge beyond the gang saw. More than one such presser roll can be used if desired on the upper and lower belt sets.

In actual operation a large fraction of improperly-cut pieces, tailings, and dust falls out of the work transfer zone through the V-belts and onto chute 26, from which they are collected for other use. The properly-cut pieces and other fragments that are retained in the work gripping and transfer zone eventually discharge onto screen 25, and those pieces that are so expelled with substantial force are deflected onto screen 25 by deflector 24. In this drawing the structural framework, guards, shielding, driving mechanism, motors, controls, etc., which are conventional, are not shown. As the operating parts shown preferably are mounted in a unitary supporting structural framework, the normal vibration of the machine serves to sift the fines and tailings from the properly-cut pieces on the V-belts and on screen 25 and to drop them onto chute 26.

Figure 2:
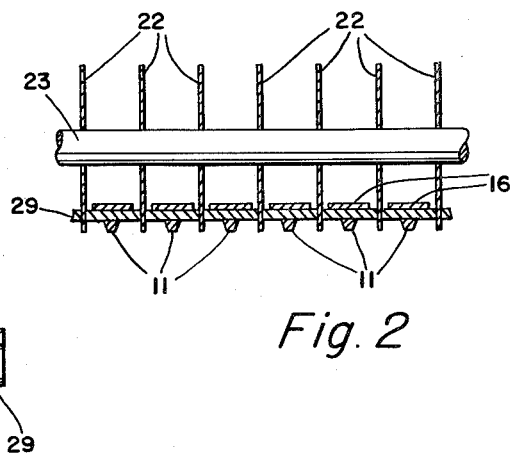

FIGURE 2 details a section through axle 23 of circular gang saw 22. It shows the seven parallel saw blades positioned apart from each other 2¾ inches on centers and the upper and lower endless belts which pass between the blades. The lower V-belts 11 support a rolled piece of cinnamon bark 29 from the bottom. The upper and wider flat belts 16 press downwardly on the slender roll of cinnamon as it is being cut by blades 22.

Figure 3:
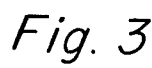

FIGURE 3 shows in even greater detail the relationship of a portion of the cinnamon work 29 passing between two particular saw blades and as it is being held by a particular V-belt on the bottom and a particular flat belt on the top. Because of the narrowness of the bottom belts relative to those of the top, sawdust and improperly-cut pieces fall out of the work gripping and transfer zone onto chute 26 and screen 25. Actually a substantial part of the necessary classifying is done, therefore, by this belt arrangement itself.

The belts themselves can be made out of virtually any flexible material, leather, cloth, rubber, etc., and preferably are of conventional fabric and rubber for supplying the desirable gripping friction and for resisting wear. There, of course, can be more or less than six upper and lower belts in a set. There can be one belt below and one belt above the spice between two saw blades as illustrated, or there can be a plurality of upper and/or lower belts between any two saw blades.

The number of saw blades need not be limited to seven. Two are necessary to trim stick spice to a uniform length. As many blades as are needed are ganged together with upper and lower belt means therebetween to accommodate particular lengths of raw work and to discharge a predetermined number of cut pieces of selected length. Preferably we use a gang of parallel circular saws as shown, but we can also use as gang saw means a group of substantially parallel band saw blades, saber saw blades, rotating or otherwise slicing knife blades (especially when the work is tough or damp), or other blades substantially transversely - disposed to the work and mounted to provide an oscillatory, rotary, or reciprocatory cutting motion between the belt means on the lengths of stick spice being fed.

The finished work receiving and classifying screen means can be, for example, a woven wire screen, a perforated plate, a net, or any other conventional foraminous apparatus suitable for retaining pieces cut to the desired predetermined length while passing shorts, dust, and tailings. More than one screen can be used also, with an upper feeding to a lower one, for example. The screen means can be extraneously mechanically driven or tapped, if desired, to assist in classifying the pieces cut, and generally are disposed to take advantage of the force of gravity for assisting the classification and clearing of the holes.

As shown in FIGURE 1, the horizontal portion of the circuit made by belt set 11 extends to the left from the work gripping and transfer zone. This, in effect, makes a convenient "moving table" work feed means on which the operator places the spice feed and aligns it transversely to the saw blades from a place of safety that is remote from both the saw blades and the work gripping and transfer zone between the belt sets. Alternatively, however, the work feed means can be a distinct apparatus apart from the saw apparatus illustrated, e.g., a conveyor belt, a downwardly disposed frame or sloping chute, or other gravity or mechanically actuated feed device.

In one adaptation of our invention only one set of power-actuated belt means is needed, and this is mounted for traveling in a circuit having a substantially planar portion opposite to a support means such as a fixed rigid or deformable table, belt or the like. This also provides a deformable work transfer zone between such support and the planar portion of the belt circuit. The support means are desirably slotted at least where the spice is cut so as to accommodate the blades while providing support for the cut work passing through and discharging from the saw blades. In such instance the friction of the single set of belts can be allowed to drag or roll the work over rigid support means and into and out of the cutting zone. Alternatively in such adaptation, the power-actuated belt means can be either the upper or the lower set of belts as shown in FIGURE 1, with the support means being the opposite set of belts being unactuated by power and exhibiting no motion towards the saw, or only such motion thereto as is frictionally provided by the work being moved by the powered set of belts.

In a further adaptation of our invention the blade means, e.g., the plurality of circular saw blades, can be set at varying widths and accommodated by appropriate belts between them. This permits the cutting of several sizes of spice sticks at one time. At the discharge end of the work transfer zone there can be mounted a plurality of chutes, each positioned to receive spice of a particular length, and classify them at that stage, thereby avoiding a separate size classification operation of mixed cut pieces.

We claim:

A stick spice saw comprising an upper and a lower set of power-actuated, substantially parallel, endless belts wherein the individual belts of said upper set are wider than the corresponding belts of said lower set, said belt sets forming a substantially horizontal, deformable frictional work gripping and transfer zone therebetween, and power-actuated gang saw means having a plurality of saw blades subdividing said work gripping and transfer zone, the individual belts in each of said sets of belts being adapted to advance towards and pass between said gangsaw means, then diverge in sets thereafter, thereby terminating said work gripping and transfer zone.

References Cited in the file of this patent

UNITED STATES PATENTS

| 177,268 | Newell | May 9, 1876 |
| 1,248,157 | Piper | Nov. 27, 1917 |
| 1,464,727 | Rawson | Aug. 14, 1923 |
| 1,561,479 | Oettal | Nov. 17, 1925 |
| 2,616,501 | Smith | Nov. 4, 1952 |
| 2,842,169 | Joa | July 8, 1958 |
| 2,969,095 | Brookhyser et al. | Jan. 24, 1961 |